UNITED STATES PATENT OFFICE.

CHARLES S. BRADLEY, OF NEW YORK, N. Y.

CHEMICAL CONCENTRATION OF METALS.

1,114,726.  Specification of Letters Patent.  Patented Oct. 27, 1914.

No Drawing.  Application filed February 27, 1913.  Serial No. 751,057.

*To all whom it may concern:*

Be it known that I, CHARLES S. BRADLEY, a citizen of the United States, and a resident of the borough of Manhattan, city, county, and State of New York, have invented certain new and useful Improvements in the Chemical Concentration of Metals, of which the following is a clear and full specification.

My invention relates to the wet chemical concentration of variable valency metals, such as copper, iron and the like, from ores or other bodies containing them, to separate the metal from the gangue and non-metallic material with which the metal is associated. The invention is especially applicable to the treatment of these metals in the higher oxid form, and may be employed in connection with ores or other bodies in which the metal already exists in the form of higher oxid, oxychlorid, oxysulfate, carbonate, silicate, or the like, or may be converted into this form. For clearness I shall refer to an example of my method as applied to the extraction or concentration of copper from cupric oxid ore.

Heretofore the more common impression seems to have been that strong acid and high oxidation are essential for the efficient extraction of copper from its ores and sulfuric acid has frequently been suggested as the solvent best suited for the ore values. I have found, however, that weaker acid and less oxidation may be just as effective or even more effective for the purpose, and my present invention involves the realization that sulfurous oxid, for example, may under proper conditions be utilized to equal or greater advantage than sulfuric acid.

The chemical reactions upon which my present invention is based are that cupric oxid when treated with an excess of calcium chlorid in water solution and sulfurous oxid is reduced to cuprous chlorid, while calcium sulfate is precipitated, and that cuprous chlorid when treated with calcium oxid is converted into cuprous oxid, while calcium chlorid is regenerated as the by-product of the reaction, and may be used again for the treatment of the cupric oxid.

$$2CuO + CaCl_2 + xCaCl_2 + SO_2 = Cu_2Cl_2 + CaSO_4 + xCaCl_2$$

$$Cu_2Cl_2 + CaO = Cu_2O + CaCl_2$$

A consideration of the heat units involved in the various chemical reactions will show clearly the power or avidity with which the reactions take place. The affinity of hydrochloric acid for cupric oxid expressed in heat units is approximately 15,270 gram calories, where one molecule of cupric oxid is involved, and in the case of two molecules the affinity of the acid would be approximately 30,540 gram calories. The affinity of two molecules of sulfuric acid for two molecules of cupric oxid is approximately 37,600 gram calories. In order to demonstrate that the new reaction is more potent for the extraction of copper than even the acids, we may tabulate the heat units involved as follows:

$2Cu, 2O = 75,040$ gram calories.
$Ca, 2Cl = 187,230$   "   "
$S, 2O = 71,000$   "   "

$333,270$   "   "

$$2CuO + CaCl_2 + SO_2 + xCaCl_2 = Cu_2Cl_2 + CaSO_4 + xCaCl_2.$$

$2Cu, 2Cl = 65,750$ gram calories
$Ca, S, 4O = 323,030$   "   "

$388,780$   "   "
$333,270$   "   "

$55,510$ gram calories.

There is thus an exothermic balance of 55,510 gram calories which is approximately 25,000 heat units more than the affinity of hydrochloric acid for two molecules of cupric oxid, and approximately 18,000 heat units more than the affinity of two molecules of sulfuric acid for two molecules of cupric oxid.

In carrying out my invention the ore is preferably first crushed to about twenty mesh size and digested preferably near the boiling point with sulfurous oxid and calcium chlorid solution, which latter is present in excess of that required to form the cuprous chlorid and calcium sulfate, so that a further quantity of calcium chlorid still remains to maintain the cuprous chlorid in solution. The cuprous chlorid and the calcium chlorid solution may then be filtered off and treated with calcium oxid to produce cuprous oxid and regenerate the calcium chlorid for reuse in the first reaction. The cuprous oxid thus formed is a precipitate and may be filtered off from the regenerated calcium chlorid solution, the cuprous oxid being the product obtained by the method and the calcium chlorid solution is returned to the system for again taking part in the first reaction as above stated.

It will be seen from the above equations that the calcium chlorid or some equivalent substance plays an important part in giving force or effect to the sulfurous oxid. In the first reaction the bivalent copper of cupric oxid is reduced to univalent copper in the form of cuprous chlorid and sulfuric acid radical is produced, so great is the avidity or affinity of the calcium for the sulfurous oxid and oxygen to form calcium sulfate. In fact the reaction may be regarded in the light that sulfuric acid radical is formed so that in effect the sulfurous oxid in the presence of calcium chlorid is just as potent as, or even more powerful than, sulfuric acid. The high degree of economy consequent to the use of sulfurous oxid instead of sulfuric acid, becomes apparent when it is remembered that not only is sulfurous oxid easier to produce and cheaper, but only half as much sulfurous oxid is required as will appear from the equations of their respective reactions, and the calcium chlorid is used over and over again.

I claim:

1. The chemical method of extracting metals of variable valency from ore and the like, which comprises subjecting the ore or the like to the combined action of calcium chlorid and sulfurous oxid in water solution, whereby the lower chlorid of the values is obtained in solution.

2. The chemical method of extracting metals of variable valency from ores and the like, which comprises subjecting the ores or the like to the combined action of sulfurous oxid and a water solution of calcium chlorid in sufficient excess to maintain the resultant lower chlorid of the values in solution.

3. The chemical method of extracting copper from ores and the like which comprises subjecting the ore or the like which contains cupric oxid to the combined action of calcium chlorid and sulfurous oxid in water solution, whereby cuprous chlorid is obtained in solution.

4. The chemical method of extracting copper from ores and the like which comprises subjecting the ore containing cupric oxid to the combined action of calcium chlorid and sulfurous oxid in water solution in sufficient excess to obtain and maintain cuprous chlorid in solution.

5. The chemical method of extracting copper from ores and the like which comprises subjecting the ore and the like, which contains cupric oxid to the combined action of calcium chlorid and sulfurous oxid in water solution, whereby cuprous chlorid is obtained in solution and separating the solution from the gangue material.

6. The chemical method of extracting copper from ores and the like which comprises subjecting the ore containing cupric oxid to the combined action of calcium chlorid and sulfurous oxid in water solution in sufficient excess to obtain and maintain cuprous chlorid in solution and separating the solution from the gangue material.

CHARLES S. BRADLEY.

Witnesses:
Wm. A. Courtland,
Octavius Knight.

Copies of this patent may be obtained for five cents each, by addressing the "Commissioner of Patents, Washington, D. C."